No. 632,126. Patented Aug. 29, 1899.
P. KIRK.
HYDRAULIC DREDGE.
(Application filed Jan. 16, 1899.)
(No Model.) 6 Sheets—Sheet 3.
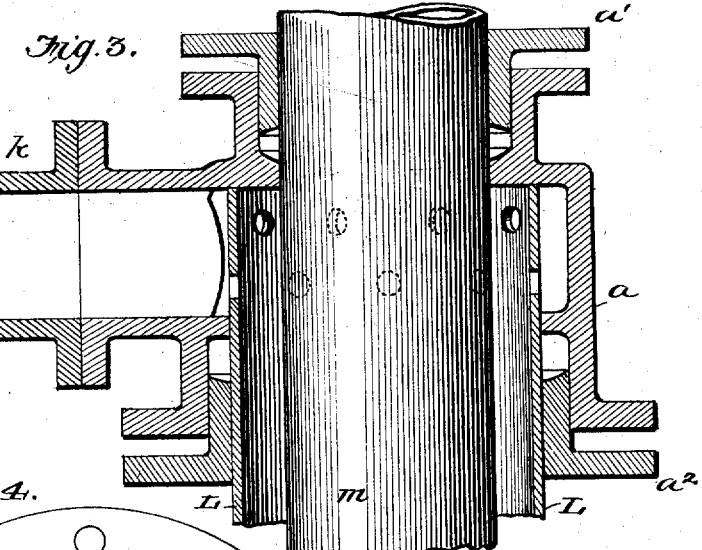
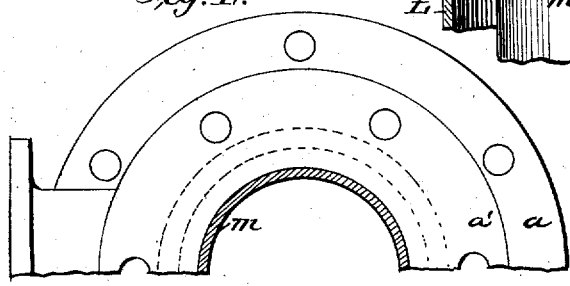
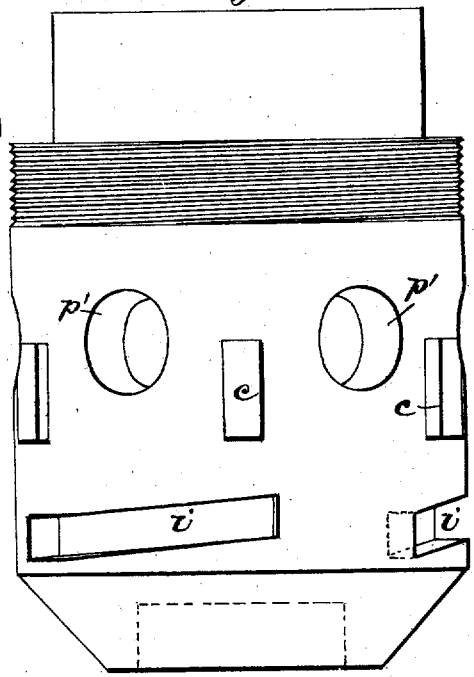
WITNESSES: Jos. A. Ryan, Edw. W. Byrn
INVENTOR Peter Kirk.
BY Munn & Co.
ATTORNEYS.

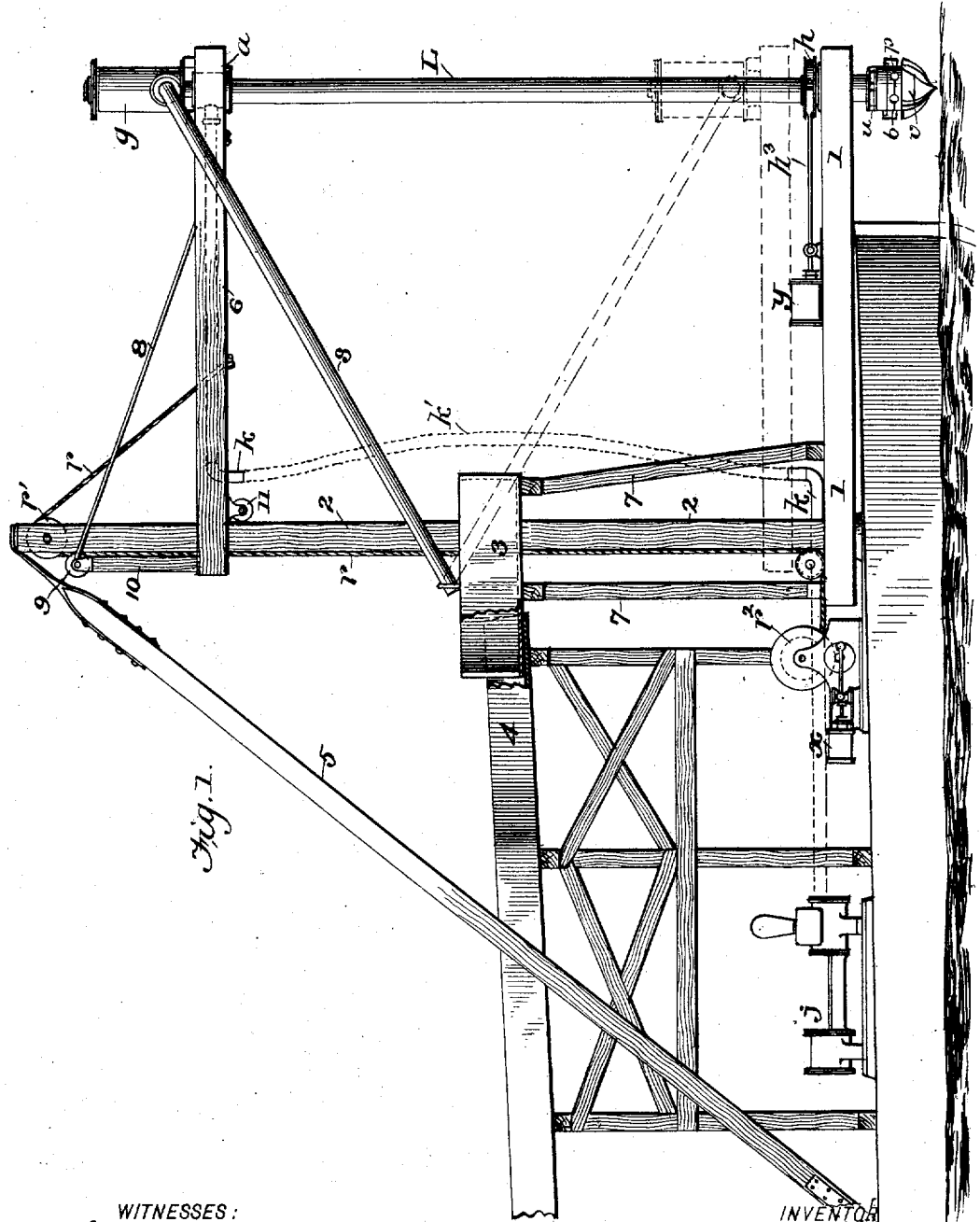

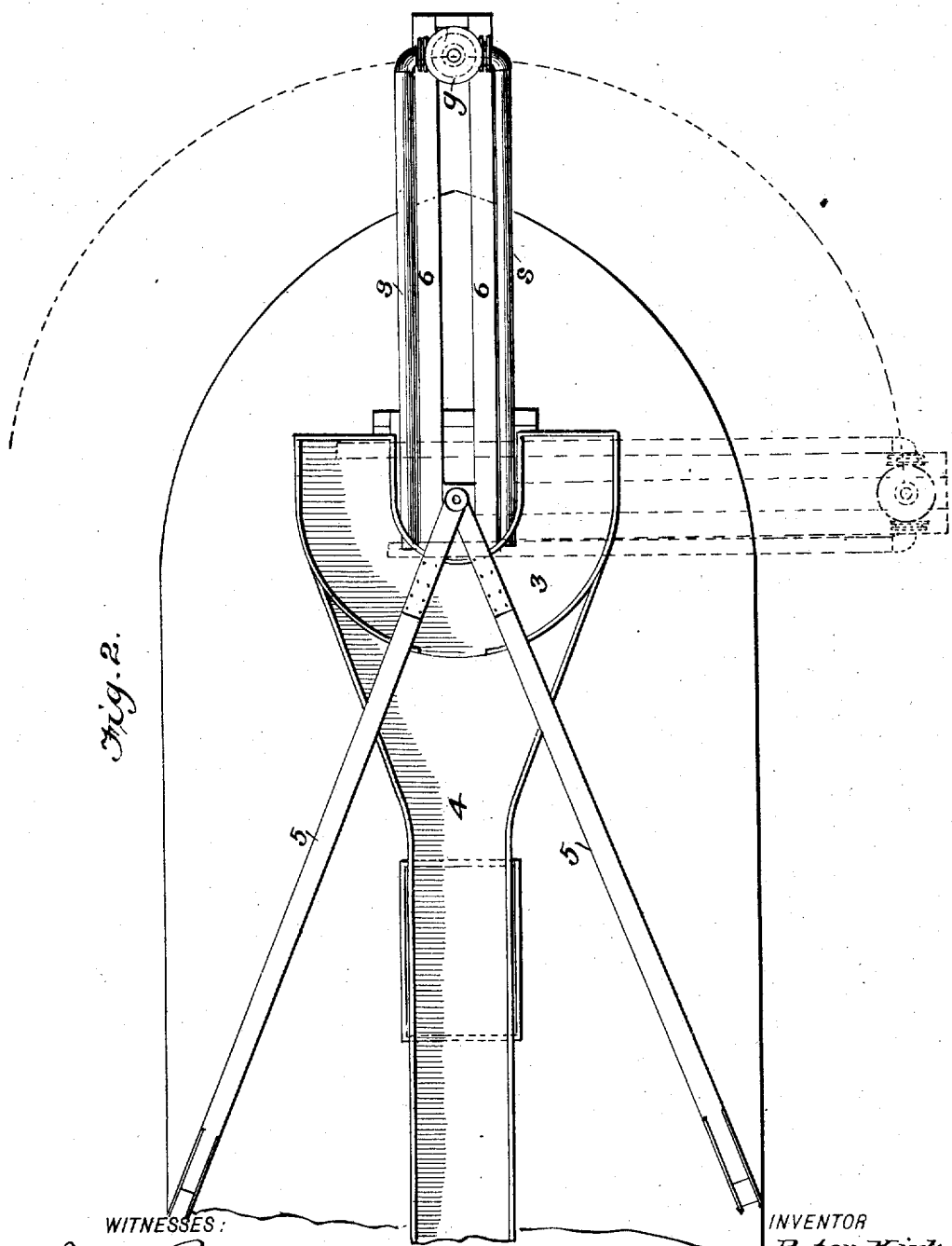

No. 632,126. Patented Aug. 29, 1899.
P. KIRK.
HYDRAULIC DREDGE.
(Application filed Jan. 16, 1899.)
(No Model.) 6 Sheets—Sheet 4.
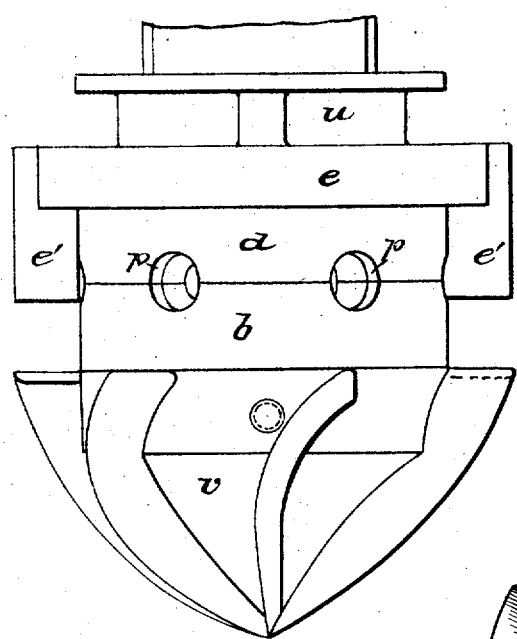
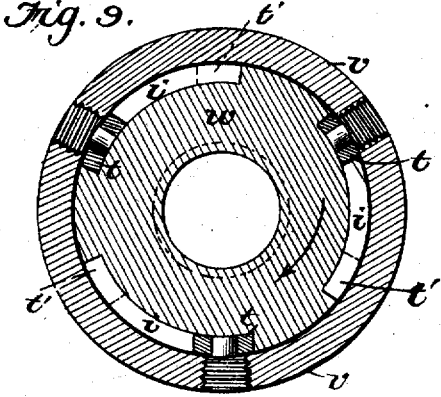
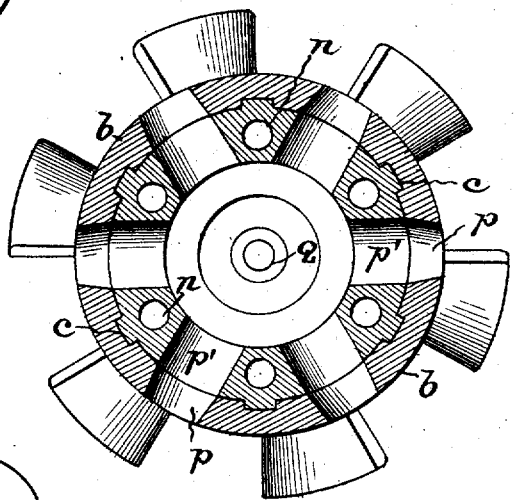
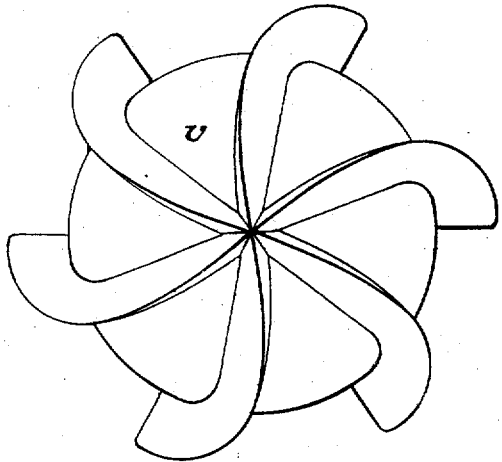
WITNESSES: Jos. A. Ryan, Edw. W. Byrn.
INVENTOR
Peter Kirk
BY Munn & Co.
ATTORNEYS.
THE NORRIS PETERS CO., PHOTO-LITHO., WASHINGTON, D. C.

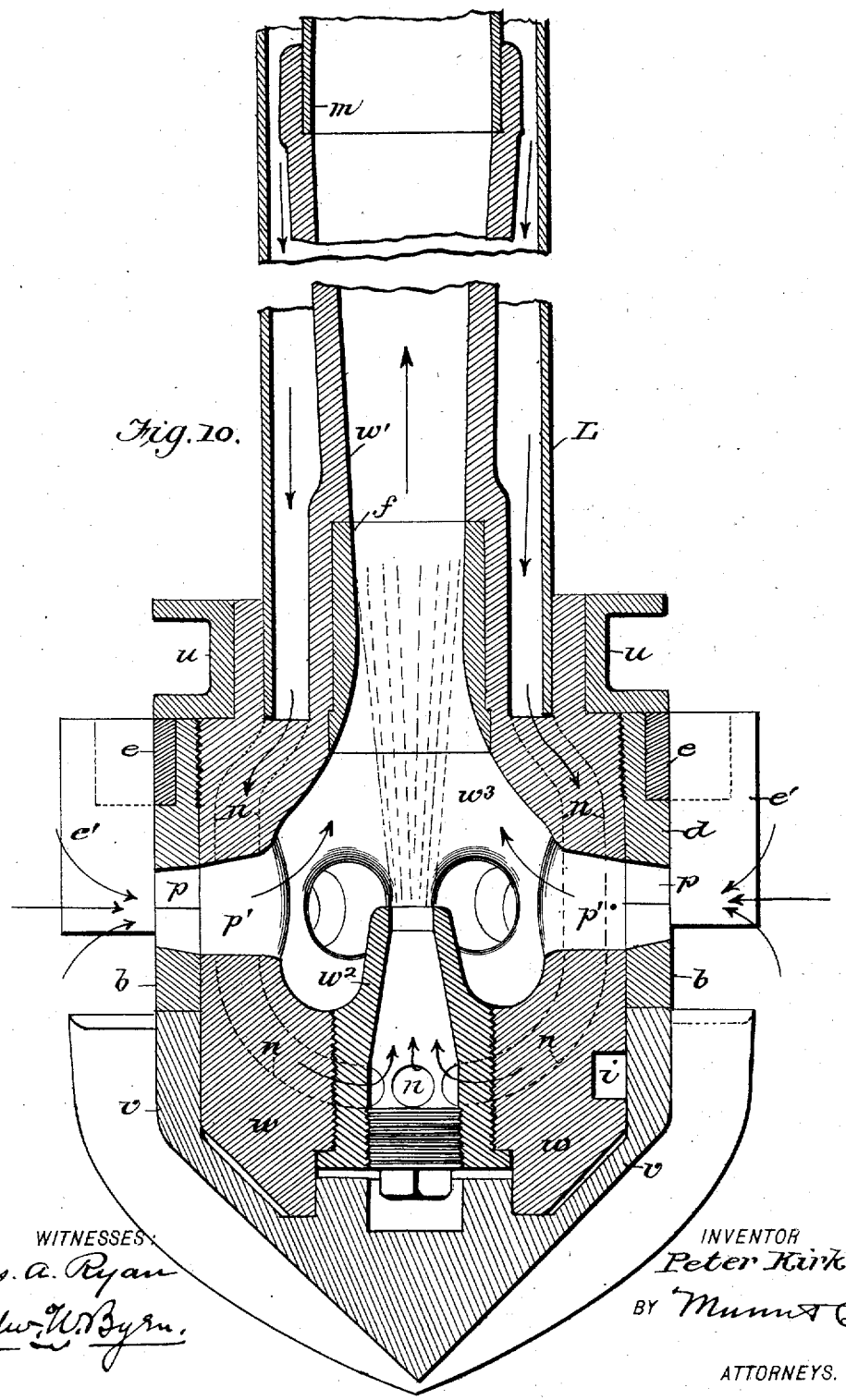

No. 632,126. Patented Aug. 29, 1899.
P. KIRK.
HYDRAULIC DREDGE.
(Application filed Jan. 16, 1899.)
(No Model.) 6 Sheets—Sheet 6.

WITNESSES:
Jos. A. Ryan
Edw. W. Byrn.

INVENTOR
Peter Kirk.
BY Munn & Co.
ATTORNEYS.

UNITED STATES PATENT OFFICE.

PETER KIRK, OF KIRKLAND, WASHINGTON.

HYDRAULIC DREDGE.

SPECIFICATION forming part of Letters Patent No. 632,126, dated August 29, 1899.

Application filed January 16, 1899. Serial No. 702,295. (No model.)

*To all whom it may concern:*

Be it known that I, PETER KIRK, of Kirkland, in the county of King and State of Washington, have invented a new and useful Improvement in Hydraulic Dredges, of which the following is a specification.

My invention is in the nature of a new machine designed to dredge rivers for gold-bearing gravel or sand covered by water or otherwise, and is also adapted for ordinary harbor or channel dredging.

It consists in the novel construction of the machine as a whole and of its various parts, as will be hereinafter fully described with reference to the drawings, in which—

Figure 12:
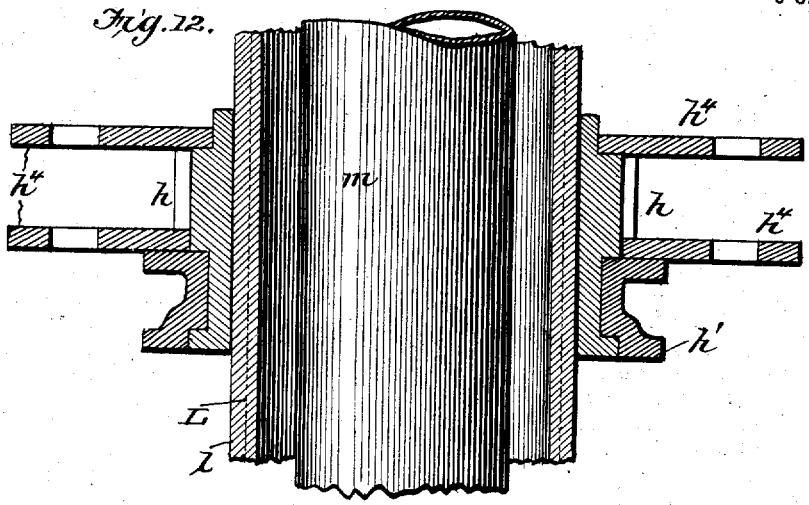
Figure 13:
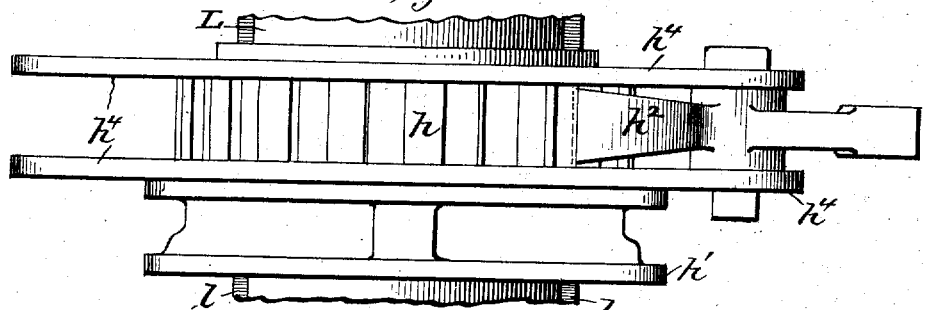
Figure 14:
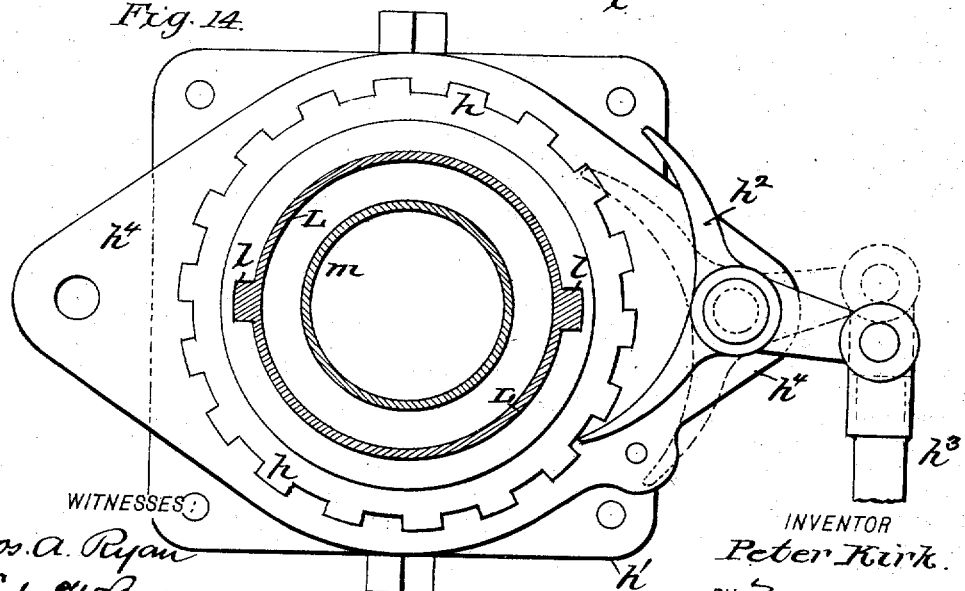

Figure 1 is a side view of the entire machine; Fig. 2, a plan view of the same. Fig. 3 is a vertical section through the center of the water-distributing box on the head of machine, showing the manner of placing holes for conveying the pressure-water through main pipe L into annular space formed between it and delivery-pipe $m$ for the passage of pressure-water to the jet. Fig. 4 is a half plan of this water-distributing box, showing bolt-holes in glands. Fig. 5 is a vertical elevation of the boring-head of the machine. Fig. 6 represents a view of the steel boring-head of the machine from the under side, showing cutters. Fig. 7 is a sectional plan of the main block of the machine, showing the position of water-holes connecting the annular space and water-jet. Fig. 8 is an elevation of the main block of machine, showing inlet-holes for material, guide-lugs for keeping steel ring in proper position, and the cam-grooves $i$ in the form of segments of screws which act as sliding clutch, which when driven the right way will keep the two steel rings $b$ and $d$ firmly together, but when reversed will unscrew to the extent of one-sixth of a revolution, thereby allowing the ring B to drop three-fourths of an inch in order to free anything which may stick in the holes. Fig. 9 is a horizontal section through the main block, showing recessed grooves $i$ and the manner of fixing clutch-blocks. Fig. 10 is a vertical section through center of lower or working end of the machine, showing the water-jet, tapered tube and neck, also the pathway of holes by which water is supplied to the jet from the annular chamber, and the main inlet-holes for material drawn through by the vacuum caused by the jet. There is also shown a ring $e$, to which is attached two wipers, made of steel, to assist in clearing the holes, and a hard-steel neck-ring $f$ to take wear and be easily renewable. Fig. 11 is a horizontal sectional plan of the working head of the machine through the center of receiving-holes, also showing the position of water-supply holes and the lugs to keep ring $b$ in place. Fig. 12 is a vertical section through the center of main pipe and ratchet-clutch, showing feathers on the outside of pipe for turning the machine, also oscillating plates for carrying pawls for the clutch. Fig. 13 is an elevation of the ratchet-clutch and base-plate. Fig. 14 is a plan of the ratchet-clutch, showing arrangement of double pawl for working and reversing.

Referring to Figs. 1 and 2, in which my invention is shown applied to a boat, the numeral 2 represents an upright mast turning at its top and bottom about pivots, the lower pivot being stepped upon a bearing on the deck of the boat and the upper one being held in a plate at the top of two inclined brace-beams 5 5 and having horizontal arms forming a crane. On this mast slides vertically an arm 6, braced by tie-rod 8 and upright 10 and guided up and down on the mast by friction-rollers 9 and 11, located on opposite sides of the mast at the top of the upright 10 and on the under side of the arm 6, respectively. This arm 6 is raised and lowered by a rope $r$ passing over a pulley $r'$ at the top of the mast and thence extends down to a drum $r^2$, operated by a hoisting-engine $x$. In a stationary elevated position on the boat is mounted on suitable supports a sluiceway 4 for conveying the gravel, sand, and water to any desired point, and into it empties a semicircular box 3, mounted on uprights 7 7 on the lower horizontal arm 1 and moving in a rotary manner with this arm and the mast. Sustained upon the outer end of the upper horizontal arm 6 is the vertical hydraulic dredging-pipe L. This pipe slides freely through a bearing in the outer end of the lower arm 1 and has mounted on its upper end a receiving-cylinder $g$, from which the sand and water are discharged through two pipes $s$ $s$ into the box 3. To permit these pipes to swivel or turn in the cylinder $g$ as the latter is raised and lowered in accommodating the changed angular relation of the pipes $s$, these pipes have elbows and a swiveling collar or sleeve connection with the said cylinder. At the upper end of the hydraulic pipe L there is an inlet-head $a$ for introducing the pressure-water. This head connects with a supply-pipe $k$ $k'$, leading to the steam force-pump $j$, and one section $k'$ of this pipe is a flexible hose to accommodate the vertical movement of the arm 6 and pipe L. On the outer end of the lower arm 1 there is a ratchet mechanism $h$, operated by a steam-cylinder $y$. This supplies the means for imparting the rotary boring action to the main pipe L, which carries a boring-head at its lower end. This ratchet mechanism is shown in detail in Figs. 12, 13, and 14, in which L is the outer tube of the hydraulic pipe, which has external longitudinal feathers $l$ running its entire length and fitting in grooves in the ratchet-ring $h$. This ratchet-ring rotates between plates $h'$ $h'$ and may be rotated in either direction by a double-acting pawl $h^2$, attached to oscillating plates $h^4$ $h^4$, operated by a rod $h^3$, leading to the engine $y$. When this ratchet-ring $h$ is rotated by a step-by-step movement, it will be seen that through the agency of the feathers on the pipe L it rotates the latter and also the boring-head below, and yet the pipe L may move freely in vertical direction through the said ratchet-collar. The double-acting pawl $h^2$ has two prongs and has an adjustment about its fulcrum, so as to bring either one of these prongs into engagement with the ratchet-ring $h$. When one prong is engaged with the ratchet-ring, as shown in full lines in Fig. 14, and the plates $h^4$ are oscillated, the ratchet-ring $h$ and tube L are turned in one direction, and when the other prong is thrown into engagement with the ratchet-ring, as shown in dotted lines, and the plates $h^4$ are oscillated the ratchet-ring and tube L are turned in the other direction.

Referring now to Figs. 3 to 14, illustrating in detail the hydraulic pipe and boring devices, $a$, Fig. 3, is the inlet-head for the pressure-water. This is an annular chamber, which on one side communicates with the water-inlet pipe $k$ and surrounds the upper end of the main vertical pipe L, which has a series of holes opening into the annular space of head $a$. Through this head there passes centrally within pipe L an internal tube $m$, which passes through a stuffing-box $a'$ at the top and opens into the receiving-cylinder $g$, Fig. 1. Around the lower edge of the head $a$ there is another stuffing-box $a^2$, which closes the joint with the main pipe L. Water introduced into this head through pipe $k$ passes down between the pipe L and central tube $m$ to the boring-head below, and having then performed its work rises with the sand and gravel through the center of the tube $m$ into the receiving-cylinder $g$.

Referring now to Figs. 5 to 11, and more especially to Fig. 10, I will describe the boring and hydraulic dredging device. The main element in its construction is the head-block $w$. This has an extension $w'$ in the form of a tapered tube that connects with the inner tube $m$ and has a flange also that connects with the lower end of the main pipe L. Just inside the pipe L the block $w$ has communicating passage-ways $n$, which pass down through the block and open laterally into the interior of a nozzle $w^2$, which discharges upwardly onto an enlarged central chamber $w^3$. Alternating with the passage-ways $n$ there are inlet-openings $p'$, which permit water, sand, and gravel from the outside to be drawn in and forced upwardly by the jet, passing upwardly through the nozzle $w^2$. On the outer periphery of the block $w$ there is an upper ring $d$ and a lower ring $b$, through the adjacent edges of which are formed openings $p$, registering with the inlet-openings $p'$ in the block $w$. The upper halves of openings $p$ are formed in ring $d$ and the lower half in the ring $b$, which is independently movable, being arranged to drop down to increase the size of the holes $p$, as hereinafter described. On the outside of block $w$ (see Figs. 8 and 9) are formed cam-grooves $i$ $i$, in which rest clutch-blocks $t$, connected by screw-stems to the terminal boring-cap $v$. This boring-cap is of conical shape and has a series of radial cutting-flanges for boring and cutting into the sand and gravel at the bottom of the river. When the boring-cap is turned one way, its clutch-blocks $t$, resting in the higher ends of the cam-grooves $i$, hold the ring $b$ up tightly against ring $d$, leaving the round holes $p$ therethrough; but when the cap is turned in the other direction its blocks $t$ pass to the lowest end of the cam-grooves $i$ and allow the ring $b$ to drop down three-fourths of an inch, and thus enlarging the holes $p$ and allowing them to be relieved when clogged, as will be hereinafter described. To guide the ring $b$ up and down it has on its inner side vertical grooves that slide over lugs $c$, formed on the block $w$, as shown in Figs. 8 and 11. At the upper end of the ring $d$ there is a loosely-turning collar $e$ bearing downwardly-projecting arms $e'$ for clearing the holes $p$, and inside the discharge-throat of the block $w$ there is a detachable hard-steel bushing $f$ to receive the wear of the gravel and be renewed when worn.

In the working of this machine the first thing necessary will be to have it anchored firmly in position over the portion of material it is desired to lift. Then by means of the hoist and crane the boring-head is lowered onto the material, and then the ratchet-engine $y$ will commence to rotate it. Water of the required pressure will be turned on from the pump $j$ along supply-pipes marked $k$ $k'$ into the water-distributing box $a$ at the top, from whence it travels through the annular space formed between the two pipes L and $m$ down to the working head, then through the passage-ways $n$ and nozzle $w^2$ in a jet which by displacement causes a vacuum which sucks the material through the holes $p$ into the chamber $w^3$, whence it is forced by the water through the neck $f$ up through the delivery-pipe $m$ into receiving-box $g$ on top of the arm of the crane, thence through the delivery-pipes $s\ s$ into delivery-box 3, which rotates with the crane, and from this it is run through the sluice-boxes.

As will be readily seen by referring to Fig. 1, the machine is able to work up and down vertically for twenty-five feet and in any part of its semicircular radius without disarranging any of its parts, as the pivoted crane supports on its arms both the supply and delivery pipes, distributing-box, receiving-box, delivery-box, and ratchet-turning engine, and all swing together to any part of the radius. This enables the machine to be easily removed a little to one side in case it comes upon large rocks, &c.

Special provision has been made to remove rocks or other hard material which will undoubtedly sometimes get fast in the holes $p$. This is done principally by the arrangement of the sliding clutch formed by blocks $t$ and cam-grooves $i$, (shown in Figs. 8 and 9,) and is done in this way: When the machine is working normally and the right way around, the boring-head is driven by the clutch in the position shown at $t$, Fig. 9, and the steel rings $b$ and $d$, through which the holes $p$ are formed, are pressed close together; but if it is desired to remove anything which has got fast in the holes it is done thus: The pump is stopped and the pawl of the reversing ratchet-clutch is turned to the other side, when the turning-engine will reverse the machine. The working head being held by its cutters in the material allows the inside block $w$, Figs. 8 and 9, to turn back with the cam-grooves $i$ until it meets the clutch-blocks $t$ at point marked $t'$ on Fig. 9, and the cam-grooves, which are segments of a quick screw, in their passage from $t$ to $t'$ cause a vertical drop of the head $v$ and ring $b$, Fig. 10, of three-fourths of an inch, which of course enlarges the holes $p$ and at once relieves anything that may have become fast in the same, and the pressure-pump having been stopped the obstruction is forced back out of the hole by the backlash of the water which is in the central tube of the machine. It will be noticed also on referring to Figs. 10 and 11 that the taper holes $p$ through the inner block $w$ are larger in diameter than the corresponding holes $p'$ through the steel rings $b$, so that anything that will go through the holes $p$ in the rings will be sure to pass through the machine.

The ring $e$, which carries the two wiper-arms $e'$, is free to turn around on the block, but is held in place by the channel-ring $u$, which is keyed on the block above it. The action of the wipers is this: When the material is drawn close around the machine, the wiper-wings are prevented from turning with the machine, and they being stationary and the machine still revolving causes the wings to wipe or clear the holes.

The channel-ring $u$, above mentioned, not only keeps the wiper-ring $e$ in place, but is also available to fix steel-spring stirring-teeth on for use in dredging fine material. These teeth are made curved and long and flexible enough to allow of their springing past any rock or other material too heavy to move.

Provision is made on the receiving-cylinder $g$ for the insertion of an iron or steel bar to loosen any obstruction that might possibly occur at the neck of the machine by crowding of the rocks.

The special feature of this machine as compared with other suction-dredgers is the absence of valves and working parts, thereby saving the destruction of these parts caused by the hammering of the rocks and gravel and the blocking or gagging of the valves. It also saves the destruction of all disks and blades running at high speeds, as in the centrifugal pump.

This machine carries the full power of suction and force to any depth required, while this is very limited in all other pumps, thus enabling the dredging of deep gravel that is too deep for other machines, whether of the suction or bucket-dredger type.

My invention is complete in all of the details and requires but little labor to operate it.

Having thus described my invention, what I claim as new, and desire to secure by Letters Patent, is—

1. A hydraulic dredge, comprising a vertical rotary mast, two horizontal supporting-arms, a vertical hydraulic pipe having inner and outer tubes, with a boring-head at its lower end, said hydraulic pipe being mounted on the upper arm and adjustable with it vertically and passing through the lower arm, a turning mechanism for the hydraulic pipe mounted on the lower arm, a receiver at the upper end of the hydraulic pipe mounted on its upper end and provided with pipes for carrying away the sand and gravel and means for raising and lowering the upper arm and hydraulic pipe and means for supplying a pressure jet of water and rotating the boring-head, substantially as shown and described.

2. A hydraulic dredge, comprising a vertical rotary mast 2 with receiving-box 3 and lower horizontal arm 1 rigidly connected together, an upper horizontal arm 6 braced and provided with hoisting mechanism as described and sliding vertically on the mast, the double-tube hydraulic pipe L mounted on the upper arm and provided with an inlet-head $a$ for water and a supply-pipe with flexible connection, the receiving-cylinder $g$ mounted on the upper end of the inner tube of pipe L and having swiveling discharge-pipe $s$, a ratchet-collar embracing the pipe L and connected to it for a rotary movement therewith, but a vertical slip movement therethrough, and a boring-head with hydraulic jet-nozzle arranged on the lower end substantially as and for the purpose described.

3. In a hydraulic dredge, the combination with a double-tube hydraulic pipe bearing a boring-head at its lower end, and a hydraulic jet-nozzle within it, said pipe having an external feather running longitudinally the distance of the vertical adjustment, a ratchet-collar embracing said pipe and having a groove fitting the feather, and a double-acting oscillating pawl for rotating the ratchet-collar and hydraulic pipe substantially as and for the purpose described.

4. In a hydraulic dredge having a double-tube boring-pipe, the combination with the inner and the outer tube; of an inlet-head $a$ having an inlet-opening on one side and an annular chamber surrounding the outer tube and communicating with it, a stuffing-box at the upper end fitting the inner tube, and a stuffing-box at the lower end fitting the outer tube substantially as and for the purpose described.

5. In a hydraulic boring-head, the combination with an inner and outer tube; of a head-block with central upwardly-projecting nozzle, said block being connected to the lower ends of said tubes and having two sets of passages, one set communicating with the space between the two tubes, and the receiving end of the nozzle, and the other set alternating in position with the first set and opening from without the head laterally into the suction-chamber of the nozzle and the interior of the central tube substantially as shown and described.

6. A hydraulic boring-head having lateral inlets for the dredged material made adjustable as to size and arranged to be opened by a reversal of the boring-head to release obstruction substantially as and for the purpose described.

7. A hydraulic boring-head having lateral inlets for the dredged material, said inlets being formed partly in a stationary piece, and partly in a movable piece, and a loose boring-cap arranged on the head to turn, and adjust the movable piece of the inlet-opening to increase the size of the latter substantially as and for the purpose described.

8. A hydraulic boring-head having lateral inlets for the dredged material, a movable collar or ring $b$ forming the lower part of said inlets and having vertical guides, a subjacent loosely-turning boring-cap $v$, said cap having a loose drag connection with the head-block by means of cam-grooves $i$ and blocks $t$ to raise or lower the cap and the ring $b$ by the rotary motion of the cap on the head-block substantially as and for the purpose described.

9. A hydraulic boring-head having lateral inlets for the dredged material and a loosely-turning ring $e$ with wiper-arms $e'$ extending down in front of the said inlet-openings substantially as and for the purpose described.

10. A hydraulic boring-head comprising block $w$ with cam-grooves $i$, lugs $c$, radial openings $p'$, longitudinal channels $n$, nozzle $w^2$ and steel throat $f$; in combination with boring-cap $v$, rings $b$ $d$, loose ring $e$ with wiper-arms $e'$, and the inner and outer tubes L and $w'$ substantially as and for the purpose described.

PETER KIRK.

Witnesses:
 JNO. G. KELLETT,
 GEO. S. KIRK.